July 5, 1932.  O. YARNELL  1,866,185
AUTOMOBILE SIGNAL
Filed March 22, 1929   2 Sheets-Sheet 1
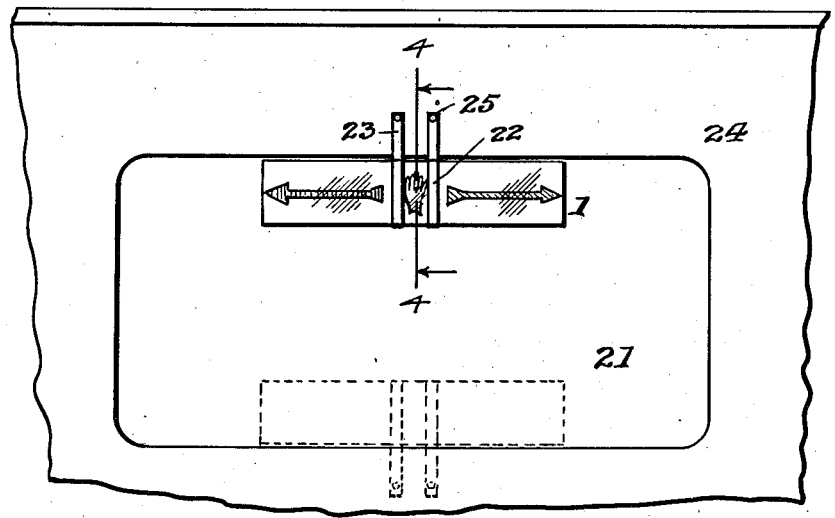
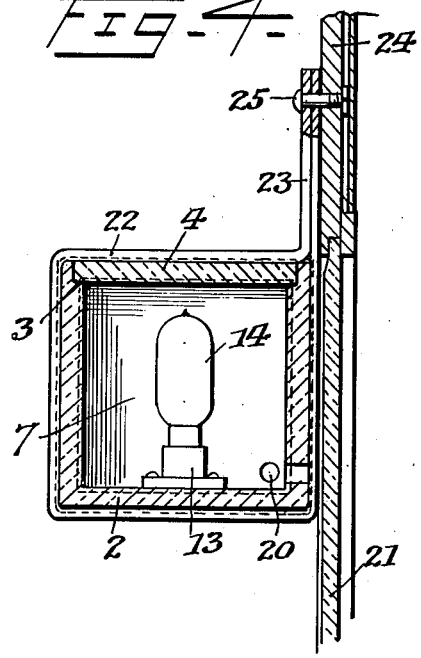
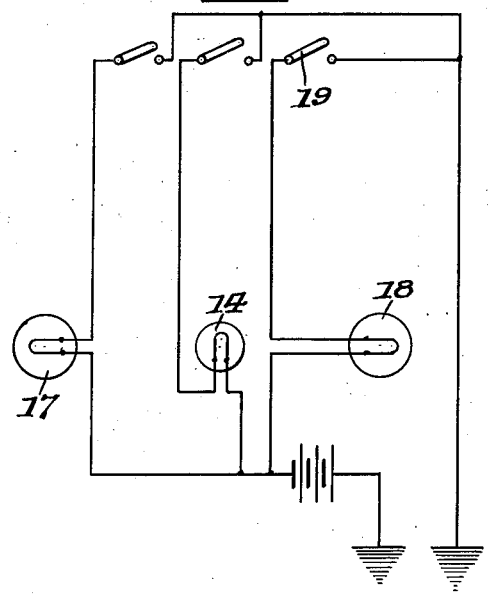
Inventor
O. Yarnell
By Jacobi & Jacobi
Attorneys July 5, 1932.  O. YARNELL  1,866,185
AUTOMOBILE SIGNAL
Filed March 22, 1929    2 Sheets-Sheet 2
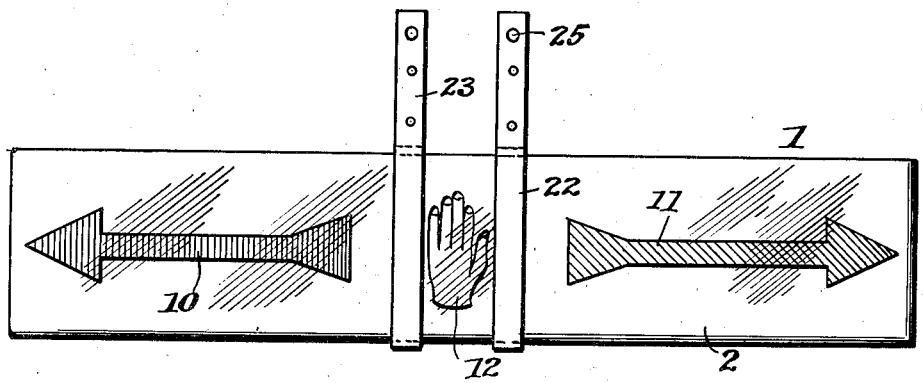
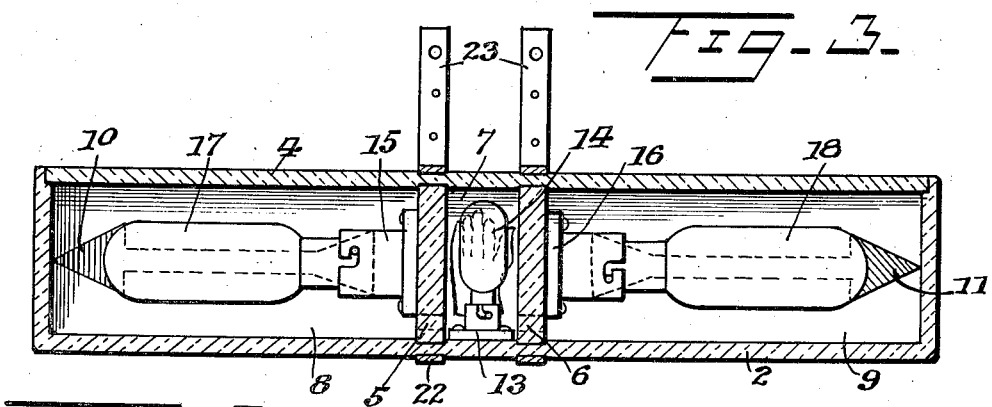
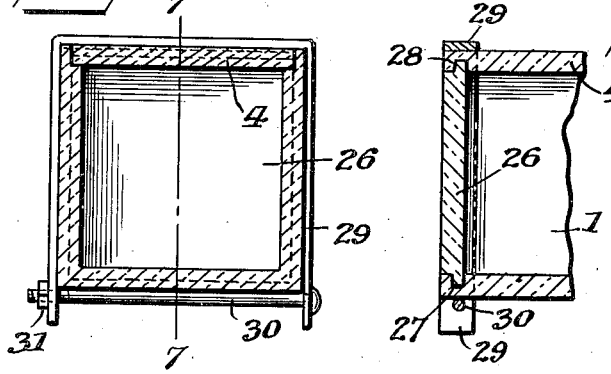
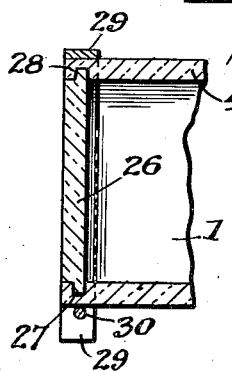
Inventor
O. Yarnell
By Jacobi & Jacobi
Attorneys Patented July 5, 1932

1,866,185

UNITED STATES PATENT OFFICE

ORAN YARNELL, OF DECATUR, ILLINOIS

AUTOMOBILE SIGNAL

Application filed March 22, 1929. Serial No. 349,092.

The present invention relates to improvements in automobile signals and has for its principal object to provide a signal casing that it is constructed wholly of glass so that the same will be visible from all directions.

One of the important objects of the present invention is to provide an automobile signal that is adapted to be mounted on the automobile in such a manner as to permit the signal to warn pursuing as well as approaching drivers of the intentions of the driver of the automobile upon which the signal is mounted, said signal being further adapted to warn pedestrians.

A further and important object of the invention is to provide an automobile signal that is simple in construction, inexpensive, strong and durable and further well adapted to the purpose for which it is designed.

Other objects and advantages of the invention will become apparent during the course of the following description when taken in connection with the accompanying drawings.

In the accompanying drawings wherein like reference characters indicate corresponding parts throughout the same:

Figure 1 is a side elevation of the automobile signal embodying my invention showing the same mounted on the back of an automobile for disposition adjacent the rear window.

Figure 2 is an elevational view of the signal per se with the attaching brackets associated therewith.

Figure 3 is a longitudinal vertical sectional view through the glass casing for more clearly disclosing the partitions arranged therein.

Figure 4 is a vertical sectional view taken approximately on the line 4—4 of Figure 1.

Figure 5 is a diagrammatic view of the wiring for the signal lamps showing the switches for controlling the same selectively.

Figure 6 is a view similar to Figure 4 showing a modification of the glass casing wherein the ends are removable, and Figure 7 is a sectional view taken approximately on the line 7—7 of Figure 6.

In the drawings wherein for the purpose of illustration is shown the preferred embodiment of my invention, the numeral 1 designates generally my improved automobile signal, the same comprising a substantially rectangular shaped casing 2 that is constructed wholly of glass, the top of the casing being open. The sides as well as the end walls of the one piece casing 2 are formed with shoulders at the upper inner edges thereof as indicated at 3 in the drawings to provide a seat for the removable glass top wall 4.

A pair of glass partitions 5 and 6 respectively are arranged within the central portion of the casing 2 and the inner faces of the sides as well as the top and bottom of the casing are channeled or grooved to accomodate the partition whereby the latter will be maintained in a proper vertical position in the casing as suggested very clearly in Figure 3.

These partitions which are made opaque in any desired manner divide the glass casing into a relatively small central compartment 7 and the larger end compartments 8 and 9 respectively.

The opposed sides of the end compartment 8 have arranged thereon the arrows 10 indicative of a left hand turn, and in a similar manner, similar arrows 11 are arranged on the opposite sides of the other end compartment 9 to indicate the making of a right hand turn. These arrows may be painted on the sides of the respective compartments of the glass casing or the sides of the compartments may be painted with the exception of the signalling arrow portion. In a similar manner the sides of the central compartment 7 are provided with a caution or stop signal in the form of a hand 12.

In order that these respective signals may be readily and easily displayed at night, suitable illuminating means is arranged in each compartment. An electric lamp socket 13 is secured in the bottom of the central compartment 7 to receive the lamp 14. Similar lamp sockets 15 and 16 respectively are secured on the outer side faces of the partitions 5 and 6 respectively for disposition within the adjacent end compartments 8 and 9. An electric lamp 17 for illuminating the signalling arrows 10 is mounted in the socket 15 while a similar electric lamp 18 is associated with the lamp socket 16 for illuminating the left hand signalling arrows 11, and this construction is clearly shown in Figure 3.

The switches for selectively lighting the lamps in the compartments of the glass casing 2 may be mounted at any convenient place within easy reach of the operator, preferably on the steering wheel, the switches for the various lamps being shown generally at 19 in Figure 5, and in this particular figure there is disclosed the wiring for the signal lamp and in connection with the respective switches and the source of electric energy. As the switch mechanism forms no important part of the present invention, a detailed description thereof is believed unnecessary.

As is clearly shown in Figure 4, suitable holes 20 are formed in the glass casing and the partition to accommodate the wiring leading to the lamp socket.

My improved automobile signal is preferably adapted to be supported either at the top or bottom at the rear window 21 of an automobile so that the signal can be seen from either the front, back or sides of the vehicle upon which said signal is mounted, and the securing means for the signal comprises a pair of strap irons or bands 22 that encircle the intermediate portion of the glass casing, the intermediate portions of the strap irons or bands being bent into substantially rectangular shaped loops to insure the retention of the removable glass top wall 4 on the casing. The free ends of the strap irons or bands extend upwardly in abutting relation as shown at 23 in Figure 4 and suitable fastening means extends through registering openings formed in the abutting end portions 23 of the strap iron and through the adjacent portion of the back 24 of the automobile whereby to rigidly support the signal in proper position. The signal is of such size as not to interfere with the vision of the driver of the vehicle through the rear window. The securing means is designated by the reference character 25. Upon referring to Figures 3 and 4 of the drawings it will be observed that the outer faces of the sides as well as the top and bottom walls of the casing are grooved to accommodate the looped portions of the supporting brackets so as to prevent slidable movement of the brackets with respect to the glass casing.

In Figures 6 and 7 of the drawings, I have shown a modification of the glass casing. In this particular form the end walls are removably associated with the casing and said removable end walls are designated by the reference character 26. A tongue 27 projects from each side of the removable end wall and the side walls as well as the top and bottom walls of the glass casing are formed on their inner faces with channels 28 to accommodate the tongues 27 and to further secure the removable end walls in position, a substantially U-shaped band 29 extends around the outer end portion of the glass casing and an elongated bolt 30 extends through registering openings formed in the free ends of the arms of each U-shaped band for engagement with the bottom of the casing. A nut 31 is threaded on the threaded end of this elongated bolt 30 as clearly shown in Figure 6.

It will thus be seen from the foregoing description, that I have provided an automobile signal that will at all times be positive and efficient in carrying out the purposes for which it is designed, and due to its simplicity, the same can be constructed at a very low cost. Furthermore the signal will not detract from the appearance of the vehicle upon which the signal is mounted.

While I have shown the preferred embodiment of my invention it is to be understood that minor changes in the size, shape, and arrangement of parts may be resorted to without departing from the spirit of the invention and the scope of the appended claim.

Having thus described the invention what I claim as new and desire to secure by Letters Patent is:

In an automobile direction signal, an elongated casing rectangular in cross section and having one of its longitudinally extending walls constituting a removable cover to permit access to the interior of the casing, the inside upper edge portions of side and end walls of the casing being formed with recesses corresponding in depth to the thickness of the cover whereby the cover may be seated in the recesses when in place and have its outer face flush with edge faces of the side and end walls, and clamps disposed transversely about said casing in spaced relation to each other longitudinally thereof and each consisting of a strip bent to form a collar fitting snugly about the casing and open at one corner and arms extending from the open corner of the collar, one arm fitting flat against the other arm and together therewith forming a shank of double thickness, the said shank being formed with fastener receiving openings.

In testimony whereof I affix my signature.

ORAN YARNELL.